United States Patent [19]

Stacy et al.

[11] Patent Number: 5,424,285
[45] Date of Patent: Jun. 13, 1995

[54] METHOD FOR REDUCING DELETERIOUS ENVIRONMENTAL IMPACT OF SUBTERRANEAN FRACTURING PROCESSES

[75] Inventors: Alan L. Stacy, Oklahoma City, Okla.; Richard B. Weber, Evergreen, Colo.

[73] Assignee: The Western Company of North America, Houston, Tex.

[21] Appl. No.: 9,790

[22] Filed: Jan. 27, 1993

[51] Int. Cl.$^6$ ............................................. E21B 43/26
[52] U.S. Cl. ................................... 507/202; 507/269; 507/922; 507/203; 166/308
[58] Field of Search ..................... 252/8.551; 507/202, 507/203, 269, 922

[56] References Cited

U.S. PATENT DOCUMENTS

| | | |
|---|---|---|
| Re. 32,302 | 12/1986 | Almond et al. ................... 166/308 |
| 3,396,107 | 8/1968 | Hill . |
| 4,374,545 | 2/1983 | Bullen et al. . |
| 4,480,696 | 11/1984 | Almond . |
| 4,488,975 | 12/1984 | Almond . |
| 4,554,082 | 11/1985 | Holtmyer et al. . |
| 4,627,495 | 12/1986 | Harris et al. ..................... 166/280 |
| 4,701,270 | 10/1987 | Bullen et al. . |
| 4,780,243 | 10/1988 | Edgley et al. . |
| 4,807,703 | 2/1989 | Jennings, Jr. . |
| 4,823,875 | 4/1989 | Hill . |
| 4,911,241 | 3/1990 | Williamson . |
| 5,002,125 | 3/1991 | Phillips et al. . |
| 5,069,283 | 12/1991 | Mack ................................... 166/308 |

Primary Examiner—Gary Geist
Assistant Examiner—Joseph D. Anthony

[57] ABSTRACT

A composite fracturing fluid consisting of a mixture of carbon dioxide liquid, nitrogen gas and an aqueous media. Nitrogen is present in the mixture in an amount from about 1.25 to about 15 parts by volume to about 1 part by volume carbon dioxide, and nitrogen and carbon dioxide are present in the mixture from about 1 to about 24 parts by volume to about 1 part by volume water at bottom hole conditions in a subterranean formation. Thickening agents, gelling agents, foaming agents, surfactants, cross-linking agents, proppants, and other additives may be mixed with the fluid to achieve fluid properties desired for various types of subterranean formations.

22 Claims, No Drawings

METHOD FOR REDUCING DELETERIOUS ENVIRONMENTAL IMPACT OF SUBTERRANEAN FRACTURING PROCESSES

FIELD OF THE INVENTION

This invention relates to a method of fracturing subterranean formations in a manner which reduces deleterious environmental impact when compared to typical prior art processes. In particular, this invention relates to a method of fracturing subterranean formations utilizing foam fracturing fluids containing a major component of nitrogen and a minor component of carbon dioxide.

BACKGROUND OF THE INVENTION

The term "fracturing" refers to processes for increasing production from gas and hydrocarbon wells. Fracturing consists of methods which either create and/or increase the size of cracks and crevices within subterranean formations. Fracturing creates larger channels in the formation, thereby allowing greater amounts of gas or hydrocarbons to flow into the well. Fracturing can be performed in many ways, such as through combustive processes, acidic processes or through hydraulic processes.

The term "fluid fracturing" refers to a method of hydraulic fracturing which consists of continuously pumping a fluid at high pressure into a subterranean formation, such as through a well tubular, to reach a wellbottom pressure exerted by the fluid sufficient to force apart cracks and crevices within the subterranean formation. In most instances, the fracturing fluid contains added "proppants." The fluid carries the proppants to the enlarged cracks and crevices within the formation and deposits them there to maintain the fractures after the fluid has been withdrawn. When the fluid is withdrawn, "vented," or "flared," from the formation, gases, such as carbon dioxide, carbon monoxide, hydrogen sulfide, propane, methane, nitrogen and well products, can escape to the atmosphere. "Well products," as used herein, denotes any product, including, but not limited to, gases and other hydrocarbons obtained from subterranean drilling processes. "Wellhead pressure" as used herein, refers to the pressure at which fluids are pumped at the surface into a subterranean formation. Wellhead pressure is to be contrasted with "wellbottom pressure", which, as used herein, is the actual pressure at which fracturing occurs in the formation, which is the sum of the wellhead pumping pressure and the fluid's hydrostatic head pressure.

Fluid fracturing processes are well known. Many types of fluids have been used in fracturing, including liquids, gases, foams and combinations thereof. Foam fracturing fluids consist of both a liquid and gas phase. Foam fracturing fluids are preferred because of their ability to clean-up easily, eliminating or minimizing the need for mechanical withdrawal techniques.

Foam fluids using carbon dioxide liquid in the liquid phase are known. These fluids have the inherent advantage of reducing the amount of water in the liquid phase. When carbon dioxide is added to the liquid phase it reduces the liquid load to be recovered from the formation because the carbon dioxide liquid changes to a gas when pressure on the well is released. Additionally, the evolution of carbon dioxide from the liquid phase to the gas phase "energizes" the liquid phase, causing more complete and rapid cleanup of the liquid load.

U.S. Pat. No. Re. 32,302 by Almond et al., issued Dec. 9, 1986, assigned to Halliburton Company, describes a fluid fracturing process wherein the two-phase fluid utilized contains between 53% and 96% by volume carbon dioxide, with a liquid phase containing liquid carbon dioxide and a foam phase containing gaseous carbon dioxide. The fluid also contains various proppants, foaming agents, gelling agents, surfactants, and other additives, however, it does not contain nitrogen.

The second phase of the fluid disclosed in U.S. Pat. No. Re. 32,302 does not form until after the fluid, in a single phase, is injected into the subterranean formation. The increased temperature at bottom hole conditions forces a phase change of the liquid carbon dioxide to gaseous carbon dioxide, thereby creating the two-phase character of the fluid.

Foam fracturing processes using nitrogen as a gas phase are known. Because nitrogen is insoluble in water, the unique clean-up advantages obtained by using carbon dioxide are generally not observed in fracturing fluids using only nitrogen. U.S. Pat. No. 4,627,495 by Harris et al., issued Dec. 9, 1986, assigned to Halliburton Company, also discloses a two-phase fracturing fluid. In this instance, the fluid contains between 10% and 96% by volume carbon dioxide or between 10% and 96% by volume nitrogen gas along with various other additives. The fluid has an initial "quality" from about 50% to about 96% or more, wherein "quality" is defined as the percentage of the volume of carbon dioxide (or nitrogen) to the volume of the carbon dioxide (or nitrogen) plus the volume of the aqueous fluid and any other additives at the existing temperature and pressure within the formation. The fluid, like that discussed above, exists in a single phase at wellhead and relies upon increased temperature at bottom hole conditions to form the secondary phase of the fluid. Use of nitrogen is discussed and, when used, the second phase is created at wellhead conditions. However, the patent does not disclose or suggest use of a foam fracturing fluid which incorporates both nitrogen and carbon dioxide.

The improvement in fluid fracturing disclosed in U.S. Pat. No. 4,627,495 is that by controllably reducing the conversion of the carbon dioxide into the gas phase while adding proppant to the fluid, a substantial maintenance of the fluid viscosity is achieved allowing the proppant to be retained in suspension without premature settling of the proppant in the well bore.

U.S. Pat. No. 5,069,283 by Mack, issued Dec. 3, 1991, assigned to The Western Company of North America, discloses use of a fracturing fluid which contains both carbon dioxide and nitrogen gas in the ratio of nitrogen to carbon dioxide in the range of from 0.2:1 to 1:1, with the ratio of the volume of carbon dioxide and nitrogen to the aqueous component of the fluid at wellhead conditions being in the range of about 1:1 to 4:1. Some advantages of the addition of both carbon dioxide and nitrogen are that it provides a two-stage cleanup, it reduces carbonate scale, and helps to stabilize the foam. The patent discloses that, notwithstanding the dissimilar characteristics between nitrogen and carbon dioxide, these two gases can be used together in a fluid fracturing process. The patent discloses that "substantial" quantities of nitrogen are incorporated into the aqueous fracturing fluid, however, the fluids used do not contain greater than equal parts of nitrogen gas to carbon dioxide.

Foam fracturing processes can contribute to deleterious effects upon the environment. For instance, when the foam fracturing fluid is drawn, vented or flared from the subterranean formation, contaminants such as carbon dioxide, carbon monoxide, hydrogen sulfide, propane, methane and well products are released into the atmosphere. Carbon dioxide is a suspected cause of the controversial global warming trend which is commonly known as "the greenhouse effect." In addition, fracturing fluids and their components often remain in the formation after the fracturing process and drilling operations have concluded. In some instances, fluids may cause deterioration of minerals normally present in the formation.

The fracturing fluids disclosed in U.S. Pat. Nos. Re. 32,302, 4,627,495 and 5,069,283 can contribute to deleterious impacts upon the environment. One source of these deleterious impacts is the large concentration of carbon dioxide used in these prior art processes.

Fracturing fluids incorporating carbon dioxide typically require extended periods of time to withdraw, vent or flare the fluid from the formation. This is due to the relatively high solubility of carbon dioxide in water, which requires a substantial amount of time for carbon dioxide to undergo a phase change from a liquid to a gas and completely evacuate from the formation. As a result, during this waiting period a large amount of well product gases and hydrocarbons are released to the atmosphere. This leads to a second source of environmental contamination; the well products themselves.

Carbon dioxide is also very soluble in well products, as much as ten or more times as soluble in well products than in water. Carbon dioxide also has a higher specific gravity than air, which contributes to residual amounts of carbon dioxide remaining in the well after the bulk of the fracturing fluid has been removed. These two factors combine to cause contamination of well products with carbon dioxides which cannot be easily removed from the well products. In many cases, surfactants are added to fracturing fluids containing carbon dioxide in order to reduce the miscibility of the fracturing fluid with the well products. This works only to a limited extent. Another method has been to flare the well products until a majority of the carbon dioxide has been recovered from the formation. This flaring releases combustion products, and other gases from incomplete combustion which are a third source of deleterious environmental impacts from fluid fracturing. Furthermore, when well products are ultimately consumed, impurities in the products reduces the efficiency in which they may be used, and this may represent a fourth source of environmental contamination.

Yet a fifth source of environmental contamination from fracturing processes is the water used in the liquid phase. Water reacts with some minerals present in subterranean formations resulting in the minerals' hydration and deterioration. Deterioration can be severe enough to contaminate well products or reduce the effectiveness of the fracturing job.

It would be desirable to provide a fracturing fluid and method of using said fluid which is capable of performing the fracturing processes described above with reduced deleterious environmental impact. It would be desirable to provide a fracturing fluid and method of using said fluid which vents quicker, maintaining or increasing clean-up efficiency while reducing the amount of carbon dioxide and other contaminant gases which contribute to deleterious environmental impacts to the atmosphere. It would be desirable to provide a fracturing fluid and a method of using said fluid which minimizes the contamination of well products with the fracturing fluid components. It would be desirable to provide a fracturing fluid and method of using said fluid which would minimally deteriorate minerals within the formation.

SUMMARY OF THE INVENTION

In accordance with the present invention, a fracturing fluid is provided, including a liquid phase and a gas phase wherein, at wellhead conditions, the liquid phase contains carbon dioxide liquid and the gas phase contains nitrogen gas. In accordance with the present invention, a fracturing fluid is provided, including a liquid phase and a gas phase wherein, at wellbottom conditions, the fluid composition contains from about 1.25 to about 15 parts by volume of nitrogen to about 1 part by volume carbon dioxide, and from about 1.0 to about 24 parts by volume nitrogen and carbon dioxide to about 1 part by volume water. In addition, the fluid can contain various additives, including, but not limited to, proppants, thickeners, gelling agents, foamers, cross-linking agents and surfactants.

In accordance with the present invention, a method for fracturing subterranean formations is provided which employs the foam fluids described herein, which can be used in many fracturing jobs, especially those where environmental sensitivity is a concern. In accordance with the present invention, a method for fracturing a subterranean formation is provided which includes mixing with an aqueous media both nitrogen gas and carbon dioxide liquid in combination with at least one additive and then transporting the fracturing fluid thus obtained to a subterranean formation for the purpose of fracturing the formation. In accordance with the present invention, a method for fracturing a subterranean formation is provided which includes pumping the fracturing fluid of the present invention into a subterranean formation at a pressure sufficient to cause fracturing of the formation and subsequently withdrawing, venting or flaring the fracturing fluid from the subterranean formation.

DETAILED DESCRIPTION OF THE INVENTION

The fracturing fluids utilized in the present invention are generally known as foam fracturing fluids. These fluids consist of a liquid phase and a gas phase. Normally, the liquid phase is an aqueous medium which can contain other liquids, such as liquid carbon dioxide. At wellhead conditions, the gas phase of the fluids of the present invention incorporate nitrogen gas and a small amount of carbon dioxide gas. At wellbottom conditions, the gas phase of the fluids of the present invention incorporate nitrogen gas and an increased amount of carbon dioxide gas resulting from the increased temperature in the formation. The fluids of the present invention typically contain a variety of other additives, including, but not limited to, proppants, thickeners, gelling agents, foamers, cross-linking agents, and surfactants.

The present invention relates to a fracturing fluid and a method of fracturing subterranean formations by injecting into a subterranean formation a fracturing fluid which includes a liquid phase and gas phase at wellbottom conditions containing from about 1.25 to about 15 parts by volume of nitrogen to about 1.0 part by volume carbon dioxide, and from about 1 to about 24 parts by volume nitrogen and carbon dioxide to about 1 part by volume water in addition to one or more other additives.

As far as the present inventors know, fracturing fluids utilizing both nitrogen and carbon dioxide with greater than 1:1 parts by volume nitrogen to carbon dioxide have not been previously used. While a prior process purports to use "substantial" amounts of nitrogen in the fracturing fluid, no prior art process of which the inventors are aware discloses use of greater amounts of nitrogen gas than carbon dioxide in the fracturing fluids where both nitrogen and carbon dioxide are employed.

One of the reasons no prior practitioner has used greater quantities of nitrogen in fluids which incorporate both carbon dioxide and nitrogen is that when high concentrations of nitrogen are mixed in fracturing fluids, the fracturing fluids have less hydrostatic head due to nitrogen's lower specific gravity relative to carbon dioxide. It has therefore been assumed that using greater nitrogen gas concentrations in combination with carbon dioxide would require greater wellhead pumping pressures and more hydraulic horsepower to achieve fracturing than when less nitrogen is used. However, the inventors of the present invention have discovered that the reduced friction in the well tubulars, experienced when fracturing with the fluids of the present invention, reduces the anticipated effects from the loss in hydrostatic head pressure. The reduction in friction in the tubulars helps to offset the increase in pumping pressures expected through the use of increased nitrogen in the fluid. Thus, surprisingly only a minor increase in the overall fracturing pressure is achieved when using the fluids of the present invention.

Another reason no prior practitioner has used greater quantities of nitrogen in fluids which incorporate both carbon dioxide and nitrogen is that, unlike carbon dioxide, nitrogen gas is sparingly soluble in water, and it has been assumed that this would give reduced cleanup efficiency. Previous practitioners relied upon the evolution of dissolved carbon dioxide to carbon dioxide gas in the water of the liquid phase to energize the water in a "solution gas drive effect" to remove water from the well. Thus, prior practitioners have believed that when the fracturing fluid is vented to the atmosphere, because less carbon dioxide is solubilized in water, there will be less gas drive effects, allowing larger amounts of water in the liquid phase to remain in, and contaminate the formation. If this were true, it would reduce the ability of the formation to produce well products.

Yet another reason why prior practitioners have not used nitrogen in greater quantities in conjunction with carbon dioxide in fracturing fluids is that it is harder to accurately monitor nitrogen gas in process control. In the present invention, however, it has been discovered that accurate process control of nitrogen is not critical. One aspect of the present invention is that carbon dioxide is added to the liquid phase to exceed the solubility limit of carbon dioxide in water at wellbottom conditions. This ensures that upon venting, the maximum solution gas drive effects are obtained for clean-up. The inventors of the present invention have found that addition of carbon dioxide to the fluid beyond carbon dioxide's solubility limit in water at wellbottom conditions does not produce greater solution gas drive effects or more effective clean-up of the fluid.

It has been found that the increased nitrogen content in the novel fracturing fluids of the present invention makes these fluids particularly useful for fluid fracturing processes. Nitrogen is an inert gas which is present in the atmosphere and use of the present invention contributes less to deleterious environmental impacts from fluid fracturing of subterranean formations than prior art processes. Nitrogen's lower specific gravity relative to air allows it to escape easily from the formation, thus very little of it remains in the formation to contaminate well products. The low reactivity and miscibility of the fracturing fluids with well products in the present invention make them ideally suited for fracturing applications, particularly those where environmental impacts are a concern.

Carbon dioxide is present in the atmosphere and has been suspected as a contributor to deleterious environmental impacts such as the controversial global warming trend or, as it is more commonly known, "the greenhouse effect." A reduction in the carbon dioxide in the atmosphere could help to alleviate this environmental phenomenon. A reduction of carbon dioxide in fluids utilized in fracturing of subterranean formations therefore could help to reduce deleterious impacts of fluid fracturing processes on the environment.

Well products are given a British Thermal Unit (BTU) rating. Well products which have high carbon dioxide contents have reduced BTU ratings. Many consumers of well products demand high BTU ratings, which typically corresponds with a carbon dioxide content in the well products of three to four percent or less. Thus, it is helpful to perform fracturing jobs with fluids that do not reduce the BTU ratings of the well products. In known fracturing processes which utilize carbon dioxide, the well products must often be flared at least initially, until a tolerable BTU rating is reached so that the well products are marketable.

Because of nitrogen's low solubility in well products and it's low specific gravity, using increased nitrogen in the present invention reduces the need for flaring, thus reducing environmental contamination. In addition, the higher quality well products produced through practicing the present invention may be processed and consumed more efficiently, thereby decreasing atmospheric contamination by product users. The lower carbon dioxide content also reduces the need for addition of surfactants which prevent carbon dioxide from solubilizing in the well products, reducing the costs and complexity of fracturing processes.

The fluids of the present invention offer the advantage of quick initial clean-up of the fracturing fluid due to the highly compressible nature of the fluids and the low solubility of nitrogen in water. The present invention offers the advantage of complete cleanup of the liquid phase due to the solubility of carbon dioxide in water and it's resulting solution gas drive effects. Reducing the liquid phase that remains in the formation reduces the amount of water that can remain in the pore throats in the formation through capillary pressure, thereby increasing the relative permeability of the formation to well products. Water can cause some types of formations, such as clays, to swell, resulting in pore throat clogging or closure. Therefore reducing the quantity of load water in the formation alleviates this swelling and reduces contamination of the well products with water. Reducing the quantity of load water in the formation also helps to reduce damage to water-sensitive minerals present in the subterranean formations to be fractured.

Practicing the method of the present invention provides a number of other benefits over prior art fracturing processes. Because nitrogen exists in the gas phase in the fracturing fluids of the present invention, increasing the nitrogen content and reducing the carbon dioxide content in the fracturing fluid reduces friction in the well tubulars and makes the fluid highly compressible. Thus, in contrast to known processes, the fluid of the present invention allows faster clean-up without the expected reduction in clean-up efficiency, as the nitrogen gas vents from the well quicker than carbon dioxide liquid which must first undergo a phase transition.

The inventors believe that the surprising ability of the present invention to maintain or increase clean-up efficiency and speed when using greater quantities of nitrogen is accomplished through the addition of an amount of carbon dioxide sufficient to saturate the water in the liquid phase at wellbottom conditions. Beyond this point, the benefits of using increased carbon dioxide are greatly reduced, and simply contributes to increased time for venting and deleterious impacts upon the environment. The reduced carbon dioxide content in the fluids of the present invention also reduces contamination of the well products with carbon dioxide, resulting in a better yield of well products.

A limited carbon dioxide content in the fracturing fluids is helpful, however. The fracturing fluids of the present process are a substantial improvement over pure nitrogen systems in that the addition of an amount of carbon dioxide increases hydrostatic head pressure exerted by the fluid without substantially increasing the friction in the well tubulars, resulting in reduced pumping pressure required to cause fracturing relative to prior art pure nitrogen processes. Reduced wellhead pumping pressure translates into less strain on equipment, and allows less horsepower to be used to pump fluid into the formation.

The presence of a small amount of carbon dioxide in the fluid helps to hydrolyze the polymeric chains in the thickeners and gelling agents used in the foam upon clean-up. The presence of carbon dioxide also reduces the surface tension of the fluid, thereby improving the clean-up of the well. As the nitrogen escapes from the formation upon venting, the resulting decrease in pressure in the formation allows carbon dioxide present in the liquid phase of the fluid to undergo phase transition to carbon dioxide gas, thus, the liquid remaining in the well is expelled as a foamy slurry. The solution gas drive effects of the carbon dioxide in the water allows for a more effective clean-up of the liquids in the well than in fluids which use nitrogen gas alone. Addition of carbon dioxide to the fluid reduces the pH of the fluid to about pH 3.8 which helps to prevent hydration of some minerals, thus reducing damage to these minerals in the formation. The present invention therefore avoids many of the problems encountered with prior art nitrogen fracturing fluids.

The fracturing process used in the present invention, involves injection of an initial "pad fluid" into the formation. The purpose of injecting this pad fluid is to prepare the formation for addition of the bulk of the fracturing fluid and increase the efficiency of the fracturing process by initiating cracks in the formation. The pad fluid carries no proppant material, thus allowing the fluid to enter existing cracks and crevices in the formation giving greater infiltration of the proppant when pressure is increased upon the formation. If the pad fluid is not added properly, then too much proppant material can be injected into the formation before the fractures have widened, resulting in clogging of the fractures, which is known as a "screen out".

The use of a pad fluid can also help to reduce loss of fracturing fluid into the formation by saturating or treating the formation before the main bulk of the fracturing fluid is added. The pad fluid may have added to it foamers, other surfactants, thickeners, gelling agents, cross-linking agents, fluid-loss agents or other additives which reduce or increase the permeability of the formation to the fracturing fluid. For instance, formations in certain types of clays may be treated with a pad fluid containing an alcohol surfactant which prevents the clay from swelling when contacted with the aqueous fracturing fluid. In other instances, acidic additives may be mixed with the pad fluid to cause fissures in otherwise impermeable formations.

After the initial pad fluid has been injected into the formation, proppants are gradually added to the bulk of the fracturing fluid as it is delivered to the formation. Other additives can be mixed into the fracturing fluid at this point to modify properties of the fluid. Continued pumping of the fluid increases the pressure on the formation, and as the widths of the hydraulically induced fractures are increased, the proppants are delivered to the enlarged cracks and crevices within the formation and deposited there such that when the fracturing fluid is removed, the proppants remain within the crevices, propping the channels open to allow greater amounts of well products to flow into the well.

As the subterranean formation begins to fill with the main bulk of the fracturing fluid, the proppant content of the fluid is reduced to zero. This step is known as the addition of the "flush fluid". The addition of proppants in the flush fluid is ceased because adding proppants after the bulk of the fracturing fluid has entered the formation will contaminate the well tubulars rather than being deposited into the fractures. This can cause a reduction in clean-up efficiency. In addition, reduction of the proppants in the flush fluid reduces the cost of the fracturing process.

Upon completion of pumping of the fracturing fluid into the formation, the formation is closed off in what is known as a "shut-in" period. The purpose of the shut-in period, which typically lasts from less than one hour to over 12 hours, is to allow the fracturing fluid to reach equilibrium within the formation. As equilibrium is reached, a minor amount of fracturing continues, however, the primary purpose of the shut-in period is to allow closure of the fractures on the proppants. This prevents loss of the proppants from the formation when the fluid is evacuated. If there was no shut-in period, the efficiency of the fracturing job can be reduced because the clean-up stage would remove much of the proppants, allowing closure of the fractures in the formation. After a sufficient shut-in period has elapsed, the fracturing fluid is drawn out of the well, vented or flared to the atmosphere in a carefully controlled process for a period of time sufficient to evacuate the majority of fracturing fluid from the formation.

Preferably, the fracturing fluids utilized in conformity with the present invention are mixed on the surface and injected fully mixed into the formation. The exact timing in mixing carbon dioxide and nitrogen is not critical, however, it is usually done after proppants are added. This is due to the fact that proppants are mixed into the fluid at atmospheric pressure in an open blender, whereas carbon dioxide and nitrogen are added to the fluid at wellhead pressure.

An example of how these components might be mixed together is described below. The pad fluid first added to the formation can contain surfactants, thickeners, foamers, gelling agents, cross-linking agents, or fluid-loss agents. The mixing of these additives may be performed in an open water holding tank at atmospheric pressure prior to pumping or mixed continuously (on the fly) during pumping. As the main body of fracturing fluid is injected into the formation, proppants are added to the fluid and other additives can be mixed with the fluid to increase the fluid's viscosity to prevent settling of the proppant. Generally, however, settling of the proppant is not a problem because of the high pumping pressures and velocity of the fluid in the well tubulars. Carbon dioxide and nitrogen are added at wellhead pressure after the fluid passes through high pressure pumps. The mixing processes referred to may be any form of mechanical mixing operation, including turbulent flow conditions within the conduits used to inject the fluid into the formation.

The components of the fluids used at various stages in the fracturing process are described below. As previously mentioned, the pad fluid injected into the well is used mainly as a treatment to prepare the well for the addition of the bulk of the fracturing fluid. The pad fluid may contain a variety of additives depending upon the fracturing job requirements and the properties of the formation. For example, in many instances, the pad fluid is simply the fracturing fluid without any proppant content. In other instances, the pad fluid contains additives, such as mineral acids like HCl, which help to dissolve the formation material and increase the effectiveness of the fracturing process. In other instances pad fluids can contain alcohols to reduce the permeability of the formation to the water in the fracturing fluid. In yet other situations, a neutral fluid can be used, such as sodium or potassium chloride solutions. The viscosity range of a typical pad fluid used in the present method is from about 50 to about 750 centipoise.

Various substances can be used as proppants within the fracturing fluid. Proppants are added to maintain the enlarged cracks and crevices which are formed through the fracturing process after the pressure has been released from the fluid and the fluid has been evacuated from the formation. A variety of materials are used as proppants, including, but not limited to, 12/20, 16/30 or 20/40 mesh Ottawa or Brady frac sand, resin-coated sands, sintered ceramic particles, gravel, or any combination thereof. Generally, however, frac sand is most often used as the proppant. In the fracturing process, proppants are added in a concentration range of from about 0.5 to about 20 pounds of proppant per gallon of fracturing fluid.

Thickeners and gelling agents are added to the fracturing fluid to increase the proppant-carrying ability of the fluid. The amount of thickeners which are added varies widely and depends upon the effects desired in the fracturing process. For example, thickeners are well known in the art and any suitable thickening or gelling agents can be used in the present invention, including those which contain one or more hydroxyl, carboxyl, sulfate, sulfonate, amino or amide functional groups. Other suitable gelling agents are polysaccharides and polysaccharide derivatives containing monosaccharides such as glucose, galactose, mannose, xylose, arabinose, or fructose. Some polysaccharide derivatives that can be used as gelling agents include, but are not limited to, guar gum, derivatives of guar such as HPG (hydroxypropyl guar), HEG (hydroxyethyl guar) and CMHPG (carboxymethyl hydroxypropyl guar), cellulose and its derivatives such as CMHEC (carboxymethyl hydroxyethyl cellulose), xanthan gum and starch. Synthetic polymers can be used as gelling agents. A few of these include, but are not limited to, polyacrylate, polymethylacrylate, polyacrylamide, acrylamide methyl propane sulfonic acid copolymers, polyvinyl alcohol, polyvinyl pyrole, and maleic anhydride methyl vinyl ether copolymers.

Cross-linking agents are usually added to the fracturing fluid at the discharge side of the open-air blender, after the proppants have been mixed into the fluid and before the fluid is pumped and mixed with carbon dioxide and nitrogen. Cross-linking agents are used to increase the viscosity of the fracturing fluid and the stability of the foam structure when polymeric materials are used as the thickeners, gelling agents or foaming agents. Suitable cross-linking agents include, but are not limited to, titanium, zirconium, chromium antimony, iron, and aluminum. The specific cross-linking agent utilized depends upon which thickener or gelling agent has been selected. Like gelling agents, the amount of cross-linking agent added varies widely and depends upon the desired effects.

Surfactants are also widely used in fluid fracturing processes. Surfactants may be added for a number of reasons. For instance, a surfactant may be added to prevent an emulsion forming between the fracturing fluid and the well products. In other instances, surfactants may be added to the fracturing fluid to increase the formation's ability to flow well products. Surfactants may be added to the fluid at atmospheric pressures when other types of additives are mixed. Some surfactants, however, such as foamers, must be added after the fluid has been pressurized. The types of surfactants utilized in the present invention include cationic, anionic, nonionic or amphoteric surfactants used to produce a stable dispersion and foam. Surfactants which can be used include, but are not limited to, alkyl quaternary amines, betaines, sulfonated alkoxylates, alkylaryl sulfonates, ethoxylated linear alcohols alpha-olefin sulfonates, fluorinated alkyl quaternary aminest ethoxylated fluorocarbon alcohols, ethoxylated fatty acids, quaternary amine ethoxylates, sulfonsuccinates, ethoxylated alkyl quaternary amines, alkanolamide ethoxylates, and nonylphenol ethoxylates.

In addition to the aforementioned proppants, surfactants, cross-linking agents and thickeners, the aqueous phase may contain other additives such as: biocides, surface tension reducing non-emulsifying surfactants, catalysts, clay-control agents, salts, fluid loss additives, buffers, gel breakers, iron-control agents, and paraffin inhibitors.

Typically the viscosity of the fracturing fluid is in a range from about 50 to about 1000 centipoise.

The preferred embodiment of the method of the fracturing process of the present invention, which utilizes the fracturing fluids of the present invention, is described below. The fracturing fluid of the present invention can be utilized and mixed in the following manner. In a first step, water from a water holding tank at atmospheric pressure is mixed in a mixing tank or on the fly with gelling agents or thickeners to provide the required fluid viscosity. Surfactants and any other additives, excluding foamers, can be added to the slurry at this time. The resulting slurry is then transported from the water holding tank or the continuous gelling mixer to a downhole blender where it is mixed at atmospheric pressure with proppants to achieve the required proppant content. The slurry is then increased to a pressure of from about 75 psi to about 125 psi to prepare it for the high pressure pumps. Foamers are usually added to the slurry at this time. The resulting slurry is transported under pressure to high pressure, tri-plex piston pumps which increase the fluid pressure to from about 500 psi to about 16,000 psi, and preferably from about 500 psi to about 12,000 psi which is necessary to initiate and maintain fractures within the formation. The nitrogen gas and carbon dioxide liquid are added to the slurry downstream of the high pressure, tri-plex piston pumps at the wellhead pressure of the fluid. The high velocity of the fluid in the well tubulars ensures adequate mixing and prevents the settling of proppants. Immediately thereafter, the composite fracturing fluid is injected into a subterranean formation, with the resulting fracturing as described previously.

While various embodiments of the present invention have been described in detail, it is apparent that further modifications and adaptations of the invention will occur to those skilled in the art. However, it is to be expressly understood that such modifications and adaptations are within the spirit and scope of the present invention.

What is claimed is:

1. A method for fracturing a subterranean formation, comprising:
   (a) mixing with an aqueous media to form a two-phase fluid, both nitrogen gas and carbon dioxide liquid, in an amount of from 1.25 to about 15 parts by volume nitrogen to 1.0 part by volume carbon dioxide, and from 1 to about 24 parts by volume carbon dioxide and nitrogen to 1 part by volume water, at temperature and pressure conditions present within said subterranean formation;
   (b) mixing with said two-phase fluid at least one additive;
   (c) transporting said two-phase fluid to a subterranean formation.

2. The method of claim 1, wherein said subterranean formation is a well-bore.

3. The method of claim 1, wherein said two-phase fluid exists in two phases at wellhead conditions.

4. The method of claim 1, wherein said fluid contains enough carbon dioxide to exceed the solubility limit of carbon dioxide in water at wellbottom conditions.

5. The method of claim 1, wherein said additive is one or more proppants, thickeners, gelling agents, foaming agents, cross-linking agents, surfactants, surface tension reducing non-emulsifying surfactants, catalysts, clay-control agents, salts, fluid loss additives, buffers, gel breakers, iron-control agents, or paraffin inhibitors.

6. The method of claim 5, wherein said proppants are 12/20, 16/30 or 20/40 mesh Ottawa or Brady frac sand, resin-coated sands, sintered ceramic particles, gravel, or any combination thereof.

7. The method of claim 5, wherein said proppants are mixed with the fracturing fluid in an amount from about 0.5 to about 20 pounds of proppant per gallon of fracturing fluid.

8. A method for fracturing a subterranean formation, comprising:
   (a) forming a mixture of a minor component of carbon dioxide liquid and a major component of nitrogen with an aqueous media to form a two-phase fluid consisting of a liquid phase and a gas phase at wellhead conditions;
   (b) mixing with said mixture at least one additive;
   (c) transporting said mixture to a subterranean formation:
   wherein said mixture contains from 1.25 to about 15 parts by volume nitrogen to 1.0 part by volume carbon dioxide, and from 1 to about 24 parts by volume carbon dioxide and nitrogen to 1 part by volume water at conditions present within said subterranean formation.

9. The method of claim 8, wherein said subterranean formation is a well-bore.

10. The method of claim 8, wherein said carbon dioxide liquid remains predominantly within the liquid phase at wellhead conditions.

11. The method of claim 8, wherein said mixture contains enough carbon dioxide to exceed the solubility limit of carbon dioxide in water at wellbottom conditions.

12. The method of claim 8, wherein said additive is one or more proppants, thickeners, gelling agents, foaming agents, cross-linking agents, surfactants, surface tension reducing non-emulsifying surfactants, catalysts, clay-control agents, salts, fluid loss additives, buffers, gel breakers, iron-control agents, or paraffin inhibitors.

13. The method of claim 12, wherein said proppants are 12/20, 16/30 or 20/40 mesh Ottawa or Brady frac sand, resin-coated sands, sintered ceramic particles, gravel, or any combination thereof.

14. The method of claim 12, wherein said proppants are mixed with the fracturing fluid in an amount from about 0.5 to about 20 pounds of proppant per gallon of fracturing fluid.

15. A fracturing fluid comprising a two-phase mixture of carbon dioxide liquid and nitrogen gas with an aqueous media which contains from 1.25 to about 15 parts by volume nitrogen to 1.0 part by volume carbon dioxide, and from 1 to about 24 parts by volume carbon dioxide and nitrogen to 1 part by volume water, at conditions present within a subterranean formation.

16. The fracturing fluid of claim 15, wherein said carbon dioxide liquid remains predominantly within the liquid phase at wellhead conditions.

17. The fracturing fluid of claim 15, wherein said two-phase fluid consists of a gas phase and liquid phase at wellhead conditions.

18. The fracturing fluid of claim 15, wherein said fluid contains enough carbon dioxide to exceed the solubility limit of carbon dioxide in water at wellbottom conditions.

19. The fracturing fluid of claim 15, wherein said subterranean formation is a well-bore.

20. The fracturing fluid of claim 15, wherein said aqueous media may contain one or more proppants, thickeners gelling agents, foaming agents, cross-linking agents, surfactants surface tension reducing non-emulsifying surfactants, catalysts, clay-control agents, salts, fluid loss additives buffers, gel-breakers, iron-control agents or paraffin inhibitors.

21. The fracturing fluid of claim 20, wherein said proppants are 12/20 16/30 or 20/40 mesh Ottawa or Brady frac sand, resin-coated sands, sintered ceramic particles, gravel, or any combination thereof.

22. The fracturing fluid of claim 20, wherein said proppants are mixed with the fracturing fluid in an amount from about 0.5 to about 20 pounds of proppant per gallon of fracturing fluid.

* * * * *